United States Patent
Habermehl et al.

(10) Patent No.: US 10,756,926 B2
(45) Date of Patent: Aug. 25, 2020

(54) SYSTEM AND METHOD FOR TRANSMISSION OF VIDEO AND CONTROLLER AREA NETWORK (CAN) DATA OVER A POWER SLIP RING ASSEMBLY

(71) Applicant: BENCHMARK ELECTRONICS, INC., Tempe, AZ (US)

(72) Inventors: Neil Keith Habermehl, Irvine, CA (US); Keith Heinzig, Irvine, CA (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 0 days.

(21) Appl. No.: 16/525,101

(22) Filed: Jul. 29, 2019

(65) Prior Publication Data
US 2020/0119948 A1 Apr. 16, 2020

Related U.S. Application Data

(60) Provisional application No. 62/692,838, filed on Jul. 1, 2018.

(51) Int. Cl.
*H04N 7/18* (2006.01)
*H04L 12/40* (2006.01)
*H04L 12/10* (2006.01)
*F41G 3/22* (2006.01)
*F41G 3/16* (2006.01)

(52) U.S. Cl.
CPC ........ *H04L 12/40045* (2013.01); *H04L 12/10* (2013.01); *H04N 7/18* (2013.01); *F41G 3/165* (2013.01); *F41G 3/22* (2013.01); *H04L 2012/40215* (2013.01); *H04L 2012/40273* (2013.01)

(58) Field of Classification Search
CPC ............................................ H04L 2012/40215
USPC ......................................................... 348/148
See application file for complete search history.

(56) References Cited

U.S. PATENT DOCUMENTS

| | | | | |
|---|---|---|---|---|
| 6,724,750 | B1* | 4/2004 | Sun ...................... | H04L 12/2856 370/352 |
| 2002/0136224 | A1* | 9/2002 | Motley ............... | H04L 12/4604 370/401 |
| 2003/0062990 | A1* | 4/2003 | Schaeffer, Jr. ........... | H04B 3/54 375/259 |
| 2004/0052346 | A1* | 3/2004 | Ohta ...................... | H04L 61/15 379/101.01 |
| 2005/0104730 | A1* | 5/2005 | Yang .................... | A47G 29/141 340/569 |
| 2006/0291400 | A1* | 12/2006 | Balasaygun ........ | H04L 65/1009 370/242 |

(Continued)

*Primary Examiner* — Leron Beck
(74) *Attorney, Agent, or Firm* — Weiss & Moy, P.C.; Jeffrey D. Moy

(57) ABSTRACT

A system for transmitting video and Controller Area Network (CAN) data over a slip ring assembly has a first Ethernet/CAN transceiver converting CAN signals with control data to Ethernet signals with the control data. A first modem converts the ethernet signal with the control data to tone sets and transmits the tone sets over the slip ring assembly. A second modem receives and demodulates the tone sets into the Ethernet signals with the control data. A second Ethernet/CAN transceiver converts the Ethernet signals with the control data to the CAN signals with the control data.

20 Claims, 4 Drawing Sheets

(56) References Cited

U.S. PATENT DOCUMENTS

| | | | |
|---|---|---|---|
| 2006/0291870 A1* | 12/2006 | Wan | H04B 10/50572 |
| | | | 398/183 |
| 2008/0168283 A1* | 7/2008 | Penning | G06F 1/263 |
| | | | 713/310 |
| 2009/0041004 A1* | 2/2009 | Emmanuel | H04L 1/1671 |
| | | | 370/352 |
| 2009/0073253 A1* | 3/2009 | Lee | H04N 7/147 |
| | | | 348/14.04 |
| 2012/0275526 A1* | 11/2012 | Hughes | H04B 3/542 |
| | | | 375/257 |
| 2013/0201316 A1* | 8/2013 | Binder | H04L 67/12 |
| | | | 348/77 |
| 2014/0126584 A1* | 5/2014 | Hwang | H04L 12/413 |
| | | | 370/466 |
| 2015/0070589 A1* | 3/2015 | Yin | H01R 39/08 |
| | | | 348/663 |
| 2016/0110618 A1* | 4/2016 | Oba | G06K 9/6215 |
| | | | 348/148 |
| 2017/0018900 A1* | 1/2017 | Angerpointner | H01R 39/08 |
| 2019/0132424 A1* | 5/2019 | Jeong | H04L 12/40006 |
| 2019/0324450 A1* | 10/2019 | Lurie | G05D 1/0246 |
| 2019/0334897 A1* | 10/2019 | Anzai | H04L 12/40 |

* cited by examiner

SYSTEM AND METHOD FOR TRANSMISSION OF VIDEO AND CONTROLLER AREA NETWORK (CAN) DATA OVER A POWER SLIP RING ASSEMBLY

RELATED APPLICATIONS

This patent application is related to U.S. Provisional Application No. 62/692,838 filed Jul. 1, 2018, entitled "ETHERNET, DATA, VIDEO, AND SIGNALS OVER POWER LINES" in the name of Neil Keith Habermehl, and which is incorporated herein by reference in its entirety. The present patent application claims the benefit under 35 U.S.C § 119(e).

TECHNICAL FIELD

The present application relates generally to the technical field of slip rings, and more specifically, to a system and method for transmitting video and Controller Area Network (CAN) data over a slip ring assembly.

BACKGROUND

Electrical slip ring platters are devices which may be used to electrically connect a rotating unit to a stationary unit where a typical cable or other wiring is not functional or less efficient for providing an electrical interface between the rotating and stationary unit. Typical slip rings may consist of a rotating member with multiple circular conductive traces and a stationary member that includes electrical brushes of various designs that ride on or in the conductive rings to electrically connect the rotating member to the stationary member.

In the past, slip rings were mainly used or the transmission of electrical power. But over time, as technology has progressed, the need arose for slip rings to be able to transmit signals other than just electrical power such as high-frequency data signals and electrical signals. For example, in vehicles which may have turrets, slip rings may have originally been used to transmit electrical power in order to rotate/move the turret. However, as technology has progressed, and turrets have become more automatized, slip rings may be required to transmit high-frequency data signals, video signals and the like. Presently, if a slip ring is designed to only transmit electrical power, the sap ring will either need to be replaced with a slip ring that is able to transmit high-frequency data signals, video signals and the like, or one a slip rings which are able to transmit high-frequency data signals, video signals and the like need to be added to the existing slip rings which are only able to transmit electrical power.

Unfortunately, replacing an existing slip ring that is only able to transmit electrical power to a new one that is able to transmit h h-frequency data signals, video signals and the like is expensive and time consuming. For example, in vehicles which may have turrets, the vehicle may be down for a substantial amount of time in order to replace the existing slip ring to one that is able to trans high-frequency data signals, video signals and the like. This may not be an option depending on where the vehicle is located. Further, adding additional slip rings which are able to transmit high-frequency data signals video signals and the like to an existing slip ring also may not be an option due to the limited space within in the vehicle.

Therefore, it would be desirable to provide a system and method that overcomes the above. The system and method would allow for transmitting video and Controller Area Network (CAN) data over an existing slip ring assembly which transmits only electrical power. The system and method would allow the existing slip ring assembly which transmits only electrical power to transmit video and Controller Area Network (CAN) data over the existing slip ring assembly without the need to add new slip rings or replace the existing slip ring.

SUMMARY

In accordance with one embodiment, a system for transmitting video and Controller Area Network (CAN) data over a slip ring assembly is disclosed. The system has a first Ethernet/CAN transceiver which convert CAN signals with control data to Ethernet signals with the control data. A first modem converts the ethernet signal with the control data to tone sets and transmits the tone sets over the slip ring assembly. A second modem receives and demodulates the tone sets into the Ethernet signals with the control data. A second Ethernet/CAN transceiver converts the Ethernet signals with the control data to the CAN signals with the control data.

In accordance with one embodiment, a system for transmitting video and Controller Area Network (CAN) data over a slip ring assembly is disclosed. The system has a control mechanism generating CAN signals with control data. A first Ethernet/CAN transceiver converts the CAN signals with control data to Ethernet signals with the control data. A first modem converts the ethernet signals with the control data to tone sets and transmits the tone sets. A DC power slip ring assembly receives the tone sets transmitted by the first modem. A second modem coupled to the DC power slip ring receives and demodulates the tone sets received from the DC power slip rings into the Ethernet signals with the control data. A second Ethernet/CAN transceiver converts the Ethernet signals with the control data to the CAN signals with the control data.

In accordance with one embodiment, a system for transmitting video and Controller Area Network (CAN) data over a slip ring assembly is disclosed. The system has control mechanism generating CAN signals with control data. A first modem converts the CAN signals with control data to tone sets and transmits the tone sets. A DC power slip ring assembly receives the tone sets transmitted by the first modem. A second modem coupled to the DC power slip ring receives and demodulates the tone sets received from the DC power slip rings into the CAN signals with the control data.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure provides a system and method in which conventional Ethernet Over Power (EOP) signals are altered to allow the transmission of video signals and CAN data signals over a conventional DC power slip ring. The system and method integrate the video and CAN data into the EOP signals via Ethernet encoders and decoders. Instead of using AC mains lines for both a power source and a modem tone transmission medium, DC vehicle power lines may be used for these purposes, with the transmission line coupling network and power conversion elements optimized for DC vehicle power lines use. An integrated Ethernet data switch may be used so the video and CAN derived Ethernet data streams can continually share the same EOP modem tone transmission medium channel.

Figure 1:
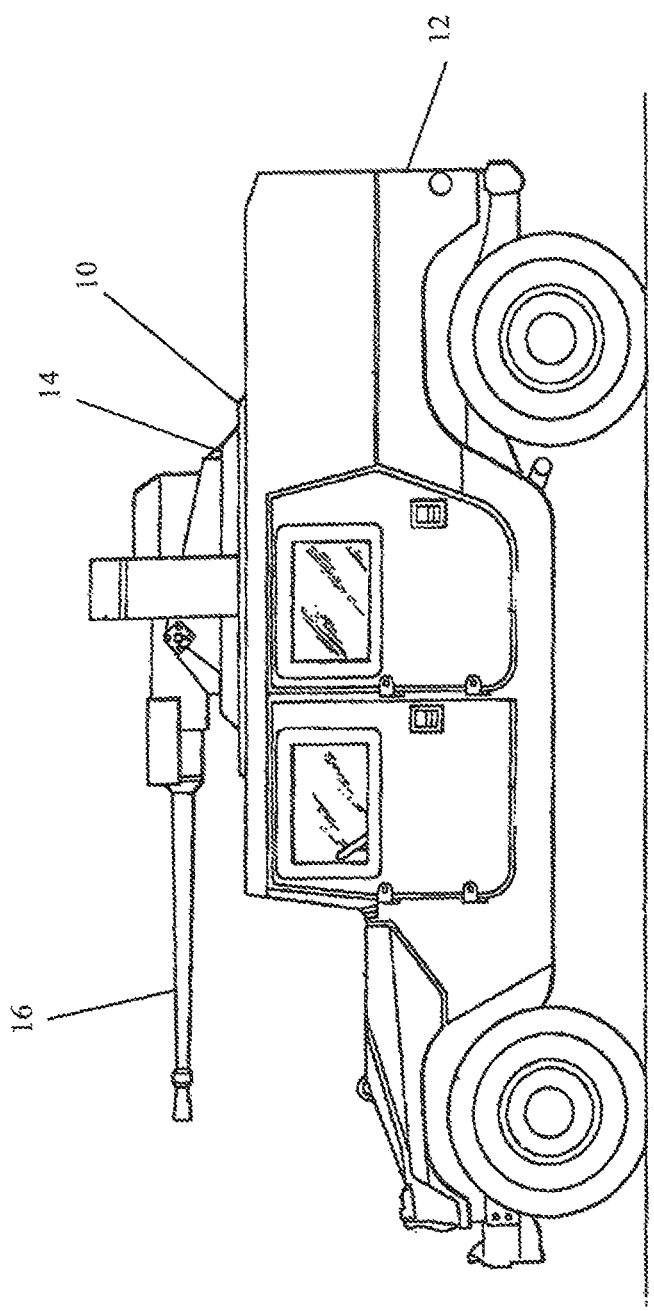
FIG. 1 is an exemplary side view of a vehicle incorporating a system for transmitting video and Controller Area Network (CAN) data signals over a slip ring assembly in accordance with one aspect of the present application.

Referring to FIG. 1, a slip ring assembly 10 is shown. The slip ring assembly 10 may be used to allow the transmission of electrical power from a stationary to a rotating structure. In the present embodiment, the slip ring assembly 10 may be used to transfer power from a vehicle 12 to a turret 14 having a gun 16 mounted thereon. The slip ring assembly 10 may allow one to transfer electrical power for moving the turret 14 and/or gun 16. While the present embodiment depicts the vehicle 12 as a High Mobility Multipurpose Wheeled Vehicle, also known as a Humvee, the vehicle 12 may be other types of vehicles.

The slip ring assembly 10 may be design to transmit electrical power. However, one may want the slip ring assembly 10 to transmit video and Controller Area Network (CAN) data signals without the need to add new slip rings or replace the existing slip ring assembly 10 with one which is able to transmit high-frequency data signals, video signals and the like. For example, one may want to modify the turret 14 and gun 16 to allow to move and shoot the gun 16 from within the vehicle 12 instead of having an individual within the turret 14. Thus, a system and method may be needed to allow the slip ring assembly 10 to transmit video and control signals. In accordance with one embodiment, the control signals may be used to move and aim the turret 14/gun 16, adjust operating parameter of a video camera or other control features of the vehicle 12.

Figure 2:
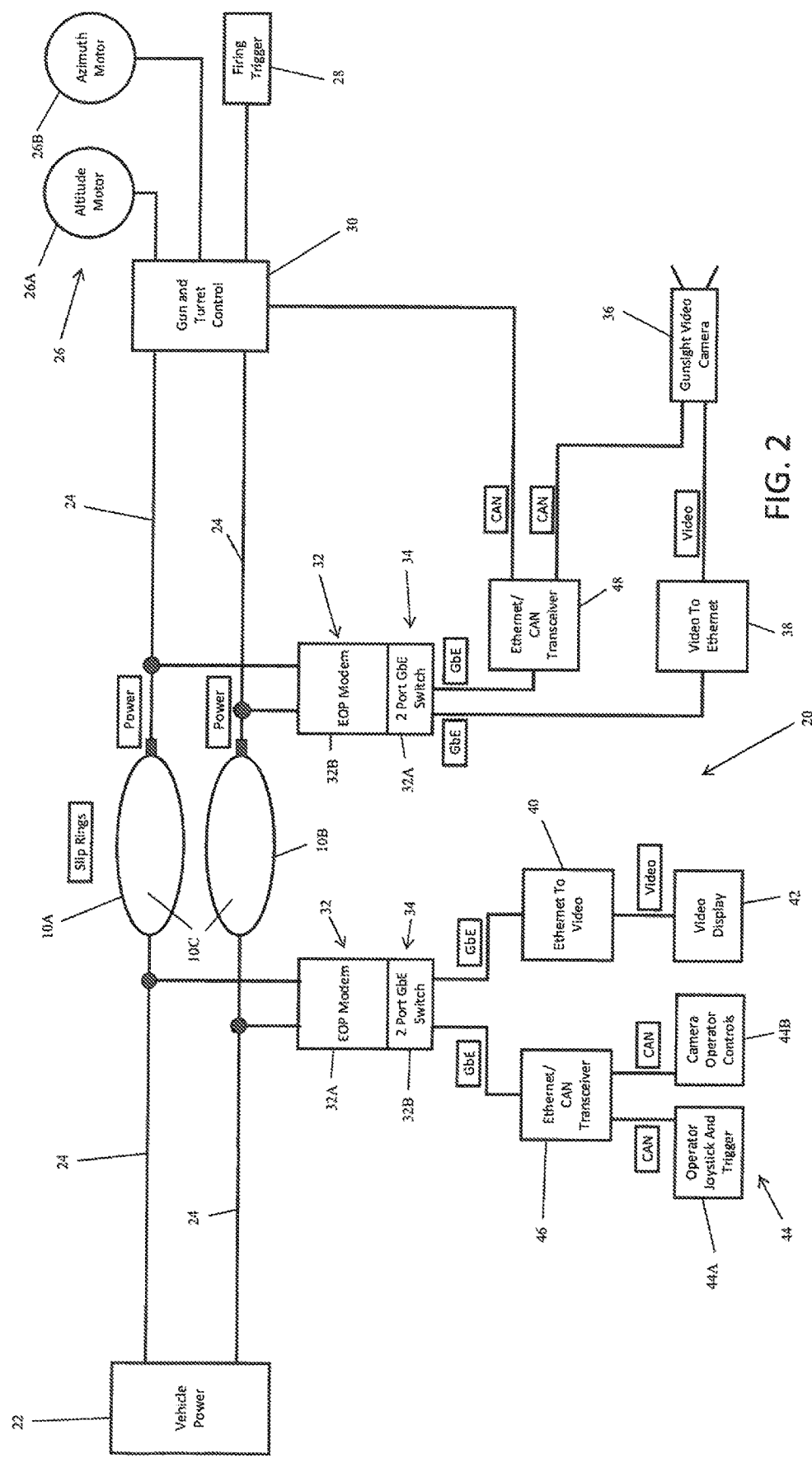
FIG. 2 is an exemplary block diagram depicting a system for transmitting video and CAN data signals over a slip ring assembly in accordance with one aspect of the present application.

Referring to FIG. 2, a system 20 for allowing the slip ring assembly 10 which transmits only electrical power to transmit video and Controller Area Network (CAN) data over the slip ring assembly 10 is shown. The slip ring assembly 10 may have a slip ring member 10A which may be a rotating member with multiple circular conductive traces and a slip ring member 10B which may be a stationary member that includes electrical brushes of various designs that ride on or in the conductive rings to electrically connect the rotating slip ring member 10A to the stationary slip ring member 10B. In the present embodiment, slip ring members 10A and 10B are rings having an opening 10C formed in a center area of each slip ring 10A and 10B.

The pair of slip ring members 10A and 10B may be designed to transmit electrical power. Thus, the pair of slip ring members 10A and 10B may be coupled to a power source 22. The power source 22 may be an AC or DC source of power. In the present embodiment, the power source 22 may be a DC power source of the vehicle 12 (FIG. 1). The pair of slip ring members 10A and 10B may transmit electrical power over power lines 24 from the power source 22 to one or more motors 26 and/or a firing mechanism 28. In the present embodiment, electrical power may be sent to a first motor 26A to adjust an altitude of the turret 14/gun 16 (FIG. 1), a second motor 26B to adjust an azimuth of the turret 14/gun 16 and to the firing mechanism 28 to fire the gun 16. In accordance with one embodiment, the electrical power may be sent to a control unit 30. The control unit 30 may be used to send the electrical power to the appropriate mechanism, i.e., to the one or more motors 26 and/or the firing mechanism 28.

In accordance with one embodiment, for the system 20 to transmit video and CAN data over the slip ring assembly 10 and power lines 24, the system 20 may use one or more modems 32. The modems 32 may be used to convert data signals to a signal format for signal transmission over the slip ring assembly 10 and power lines 24 and to demodulate the transmitted signal to decode the transmitted data information. The modems 32 may be used to convert the data signals into a plurality of tone sets. These tone sets may then be superimposed onto the power signal for transmission over the over the slip ring assembly 10 and power lines 24 and then demodulated to decode the transmitted data information. In the present embodiment, a pair of modems 32A and 32B may be used. The pair of modems 32A and 32B may be positioned within the system 20 so that one of the pair of modems 32A and 32B are positioned on each side of the slip ring assembly 10.

For the system 20 to transmit data in both directions over the slip ring assembly 10 and power lines 24, switching units 34 may be used. The switching units 34 may be used to control the transmission of data over the slip ring assembly 10 and power lines 24 in order to allow two-way communication over a single pathway. In the present embodiment, the system 20 may have a pair of switching units 34A and 34B. The switching unit 34A may be coupled to the modem 32A to control the transmission of data through the modem 32A. The switching unit 34B may be coupled to the modem 32B to control the transmission of data through the modem 32B.

The system 10 may have a video camera 36. The video camera 36 may be used to acquire video data. In the present embodiment, the video camera 36 may be mounted on the vehicle 12 to monitor a sight line of the gun 16. In order to transmit the video data over the over the power lines 24 and slip ring assembly 10, the video camera 36 may send video signals having the video data to a video to ethernet converter 38. The video to ethernet converter 38 may convert the video signals to encoded ethernet signals having the video data.

To transmit the encoded ethernet signals with the video data over the power lines 24 and slip ring assembly 10, the system 20 may use the switching unit 34B and the modem 32B to control the transmission of the encoded ethernet signals with the video data. The modem 32B may convert the encoded ethernet signals with the video data to tone sets. The tone sets may then be transmitted over the power lines 24 and slip ring assembly 10. The switching unit 34A and the modem 32A may receive and demodulate the tone sets to decode the encoded ethernet signals with the video data. The decoded ethernet signals with the video data may be sent to an ethernet to video converter 40. The ethernet to video converter 40 may convert the decoded ethernet signals with the video data to video signals. The video signals may then be viewed on a video display 42. In accordance with one embodiment, the video display 42 may be located within the vehicle 12.

The system 20 may allow for one to adjust/control the motors 26, firing mechanism 28 and/or the video camera 36. The system 20 may have a controller 44 to enter control signals to adjust/control the motors 26, firing mechanism 28 and/or the video camera 36. In accordance with one embodiment, the system may have a gun/turret controller 44A for controlling the movement of the turret 14 and the gun 16 and a video camera controller 44B for controlling the operating parameters of the video camera 36. Inputs to the gun/turret controller 44A and the video camera controller 44B may send CAN data signals with the control data to an ethernet/CAN transceiver 46. The ethernet/CAN transceiver 46 may convert the CAN data signals to encoded ethernet signals having the control data.

To transmit the encoded ethernet signals with the control data over the power lines 24 and slip ring assembly 10, the system 20 may use the switching unit 34A and the modem 32A to control the transmission of the encoded ethernet signals with the control data. The modem 32A may convert the encoded ethernet signals with the control data to tone sets. The tone sets may then be transmitted over the power lines 24 and slip ring assembly 10. The switching unit 34B and the modem 32B may receive and demodulate the tone sets to decode the encoded ethernet signals with the control data. The decoded ethernet signals with the control data may be sent to an ethernet/CAN transceiver 48. The ethernet/CAN transceiver 48 may convert the decoded ethernet signals with the control data to CAN signals. The CAN signals may then be sent to adjust/control the motors 26, firing mechanism 28 and/or the video camera 36. If the CAN signals are sent to the adjust/control the motors 26, firing mechanism 28, the CAN signals may be sent to the control unit 30. The control unit 30 may then send the CAN signals to the appropriate mechanism, i.e., one or more motors 26 and/or a firing mechanism 28.

Figure 3:
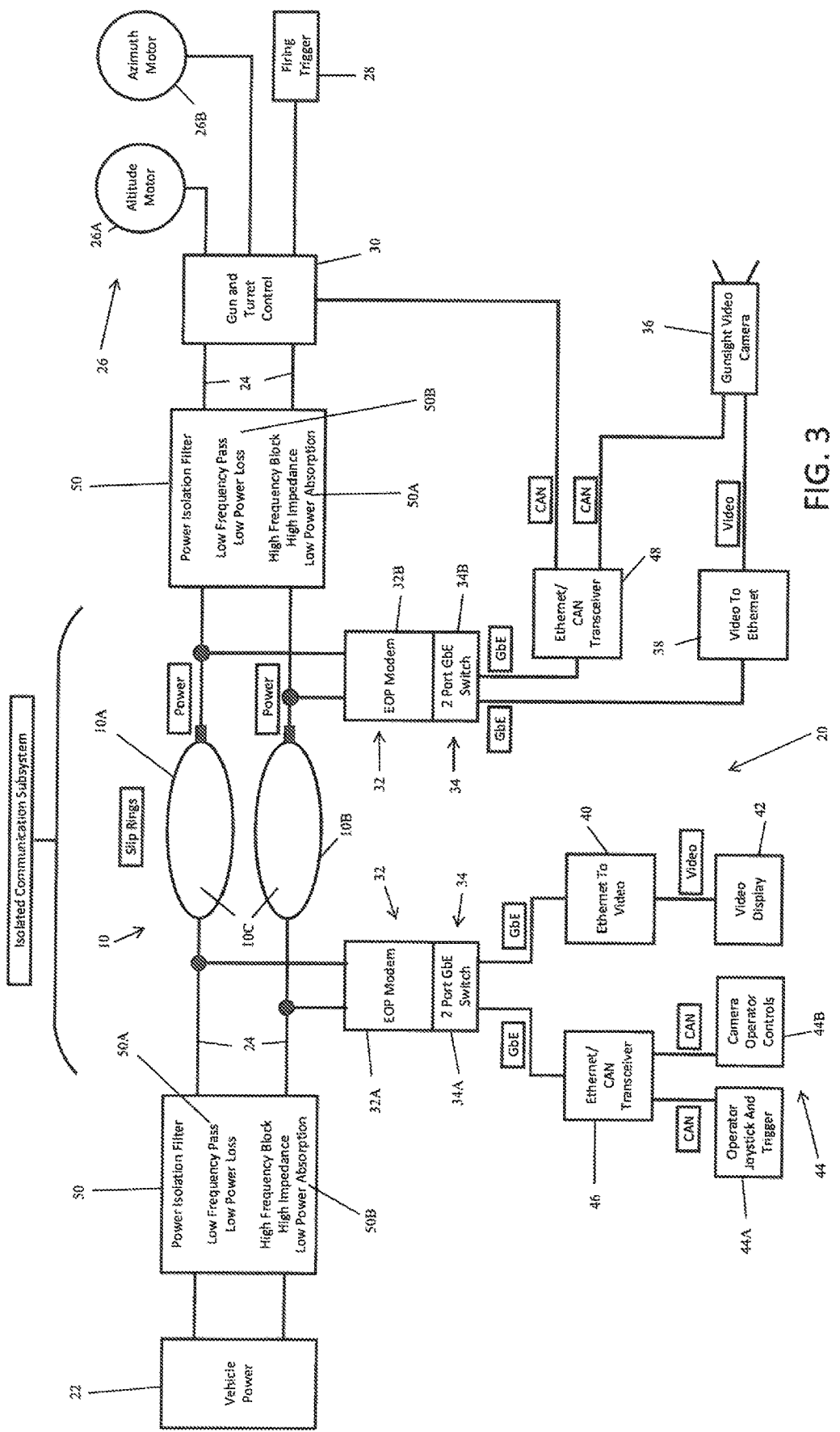
FIG. 3 is an exemplary block diagram depicting a system for transmitting video and CAN data signals over a slip ring assembly in accordance with one aspect of the present application.

In applications using modem signals over power lines, high frequency noise from the mains power supply (or vehicle power) and from noise generating power loads can interfere with the desired modem signals, which are also superimposed on the same power lines. This interference may degrade modem performance, signal integrity, and data throughput. Further, high frequency modem signals used for communication over power lines can interfere with operation of other data and signal equipment connected to the power lines. Referring to FIG. 3, the system 20 may include a power filter 50 to remove noise over the power lines 24. The power filter 50 may be designed and tuned for specific applications. The power filter 50 may consists of a plurality of sections. In accordance with the present embodiment, the power filter 50 may be designed to have a low frequency pass section 50A and/or a high frequency high impedance block section 50B. The low frequency pass section 50A may be designed to permit a low frequency or DC power to pass through with low loss of power. The terminals connected to the isolated communication subsection present a high frequency high impedance block section 50B to the high frequency modem signals to minimize absorption of desired modem signals. This high frequency high impedance block section 50B also blocks high frequency modem signals from exiting the isolated communication subsection to avoid interfering with other equipment connected to the power lines. The high frequency high impedance block section 50B may also block high frequency noise for the mains power source or noise generating loads from entering the isolated communication subsystem. The terminals connected to the power source 22 or the noise generating loads present a high frequency low impedance on the power lines 24 to absorb high frequency noise from the power source 22 or noise generating load to avoid transmission of high frequency noise to the isolated communication subsystem. Further the high frequency low impedance at the terminals connected to the power source 22 or the noise generating loads absorbs leakage of modem signals through the high frequency high impedance block section 50B to further avoid high frequency modem signals interfering with equipment connected outside the isolated communication subsystem.

In applications using modem signals over power lines the system 20 converts Ethernet data streams to modem tones to transmit data over power lines, and convert modem tones to Ethernet data streams to receive data from power lines. However, other data and signal formats and protocols can benefit from being transmitted to and from rotating equipment using the slip ring assembly 10.

Figure 4:
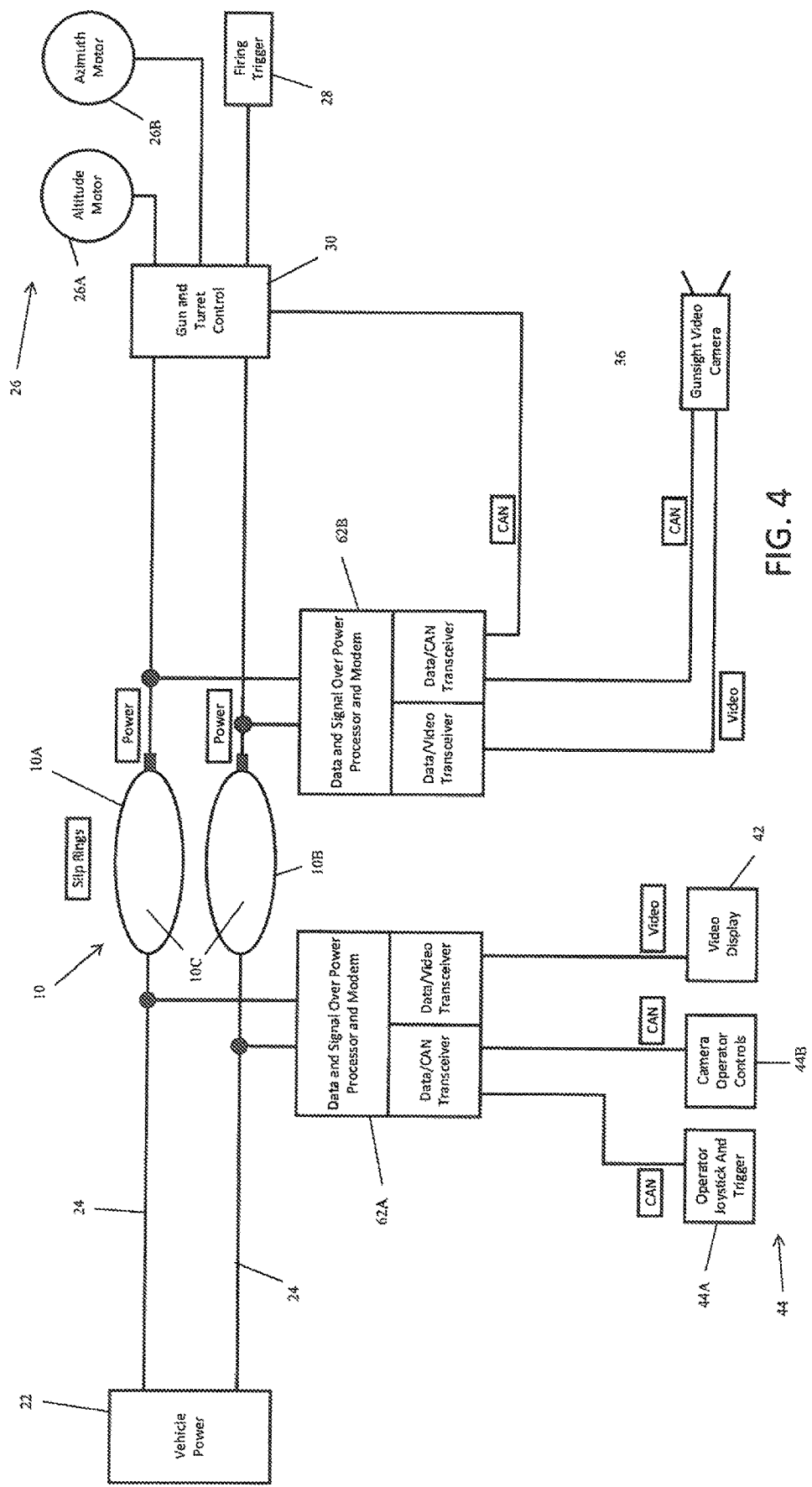
FIG. 4 is an exemplary block diagram depicting a system for transmitting video and CAN data signals over a slip ring assembly in accordance with one aspect of the present application.

Referring to FIG. 4, a system 60 may be shown. The system 60 is similar to system 20 shown and described above. However, in system 60, the modems 32, modems 32A and 32B, and switching units 34, switching units 34A and 34B have been replaced with a pair of Data/Signal Over Power modem modules 62A and 62B. Further, the video to ethernet convert 38 and the ethernet to video converter 40 are no longer required.

The Data/Signal Over Power modem modules 62A and 62B may be configured to process a plurality of combinations of data formats and signal formats. In the present embodiment, the Data/Signal Over Power modem modules 62A and 62B may each contain a two channel CAN data transceiver, a single channel video signal transceiver, a data processor, and a modem tone transceiver.

To transmit CAN data the transceiver converts the CAN format to the data format of the data processor, the data processor specifies the sequence of modem tones to be transmitted, and the modem tone transceiver transmits the modem tones. In the other module in the pair the modem tones are received by the modem tone transceiver, decoded and processed in the data processor, and the CAN transceiver converts from the data processor format to the CAN data stream format.

To transmit video signal the transceiver converts the video signal format to the data format of the data processor, the data processor specifies the sequence of modem tones to be transmitted, and the modem tone transceiver transmits the modem tones. In the other module in the pair the modem tones are received by the modem tone transceiver, decoded and processed in the data processor, and the video signal transceiver converts from the data processor format to the video signal format.

The foregoing description is illustrative of particular embodiments of the application, but is not meant to be a limitation upon the practice thereof. The following claims, including all equivalents thereof are intended to define the scope of the application.

What is claimed is:

1. A system for transmitting video and Controller Area Network (CAN) data over a slip ring assembly comprising:
   a first Ethernet/CAN transceiver convening CAN signals with control data to Ethernet signals with the control data;
   a first modem converting the ethernet signal with the control data to tone sets and transmitting the tone sets over the slip ring assembly;
   a second modem receiving and demodulating the tone sets into the Ethernet signals with the control data; and
   a second Ethernet/CAN transceiver converting the Ethernet signals with the control data to the CAN signals with the control data.

2. The system of claim 1, comprising a controller coupled to the second Ethernet/CAN transceiver sending the CAN signals with the control data to a desired component to control.

3. The system of claim 1, comprising:
   a first switching unit coupled to the first modem; and
   a second switching unit coupled to the second modem.

4. The system of claim 1, comprising a video to Ethernet converter converting video signals with video data to Ethernet signals with the video data;
   wherein the second modem converts the Ethernet signals with the video data to tone sets transmitting the tone sets over the slip ring assembly;
   wherein the first modem receiving and demodulating the tone sets into the Ethernet signals with the video data;
   wherein the first Ethernet/CAN transceiver converting the Ethernet signals with the video data to the video signals with the video data.

5. The system of claim 4, comprising a video display coupled to the first Ethernet/CAN transceiver receiving and displaying the video signals with the video data.

6. The system of claim 1, comprising an input device coupled to the first Ethernet/CAN transceiver generating the CAN signals with control data.

7. The system of claim 1, comprising an input device coupled to the first Ethernet/CAN transceiver generating the CAN signals with control data controlling movement and operation of a turret and gun.

8. The system of claim 1, comprising a power filter coupled to the slip ring assembly.

9. A system for transmitting video and Controller Area Network (CAN) data comprising:
   a control mechanism generating CAN signals with control data;
   a first Ethernet/CAN transceiver converting the CAN signals with control data to Ethernet signals with the control data;
   a first modem converting the ethernet signals with the control data to tone sets and transmitting the tone sets;
   a DC power slip ring assembly receiving the tone sets transmitted by the first modem;
   a second modem coupled to the DC power slip ring receiving and demodulating the tone sets received from the DC power slip rings into the Ethernet signals with the control data; and
   a second Ethernet/CAN transceiver converting the Ethernet signals with the control data to the CAN signals with the control data.

10. The system of claim 9, comprising:
    a first switching unit coupled to the first modem; and
    a second switching unit coupled to the second modem.

11. The system of claim 9, comprising a video to Ethernet converter converting video signals with video data to Ethernet signals with the video data;
    wherein the second modem converts the Ethernet signals with the video data to tone sets transmitting the tone sets over the DC power slip ring assembly;
    wherein the first modem receiving and demodulating the tone sets into the Ethernet signals with the video data;
    wherein the first Ethernet/CAN transceiver converting the Ethernet signals with the video data to the video signals with the video data.

12. The system of claim 11, comprising a video display coupled to the first Ethernet/CAN transceiver receiving and displaying the video signals with the video data.

13. The system of claim 9, wherein the control mechanism generates the CAN signals with control data controlling movement and operation of one of a turret, gun or firing mechanism.

14. The system of claim 9, wherein the control mechanism generates the CAN signals with control data controlling, operating parameters of a video camera.

15. A system for transmitting video and Controller Area Network (CAN) data comprising:
    a control mechanism generating CAN signals with control data;
    a first modem converting the CAN signals with control data to tone sets and transmitting the tone sets;
    a DC power slip ring assembly receiving the tone sets transmitted by the first modem; and
    a second modem coupled to the DC power slip ring receiving and demodulating the tone sets received from the DC power slip rings into the CAN signals with the control data.

16. The system of claim 15, comprising:
    a video camera generating video signals with video data; and
    wherein the second modem converts the video signals with the video data to tone sets transmitting the tone sets over the DC power slip ring assembly;
    wherein the first modem receiving and demodulating the tone sets into the video signals with the video data.

17. The system of claim 16, comprising:
    a first Ethernet/CAN transceiver converting the CAN signals with control data to Ethernet signals with the control data;
    a first switching unit coupled to the first modem;
    a second switching unit coupled to the second modem; and
    a second Ethernet/CAN transceiver converting the Ethernet signals with the control data to the CAN signals with the control data;
    wherein the first modem converts the ethernet signal with the control data to the tone sets and transmits the tone sets;
    wherein the second modem demodulates the tone sets received from the DC power slip rings into the Ethernet signals with the control data.

18. The system of claim 17, comprising:
    a video camera generating video signals with video data; and
    a video to Ethernet converter converting the video signals with video data to Ethernet signals with the video data;
    wherein the second modem converts the Ethernet signals with the video data to tone sets transmitting the tone sets over the DC power slip ring assembly;

wherein the first modem receiving and demodulating the tone sets into the Ethernet signals with the video data;
wherein the first Ethernet/CAN transceiver converting the Ethernet signals with the video data to the video signals with the video data.

19. The system of claim 18, comprising a video display coupled to the first Ethernet/CAN transceiver receiving and displaying the video signals with the video data.

20. The system of claim 17, wherein the first switching unit and the second switching unit allowing two-directional communication across the DC power slip rings.

* * * * *